US006938836B2

(12) United States Patent
Bouic

(10) Patent No.: US 6,938,836 B2
(45) Date of Patent: Sep. 6, 2005

(54) VALVE CLOSURE FOR SPRAY GUN RESERVOIR

(75) Inventor: Phillip J. Bouic, Warwicks (GB)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/431,204

(22) Filed: May 7, 2003

(65) Prior Publication Data

US 2003/0209573 A1 Nov. 13, 2003

(30) Foreign Application Priority Data

May 8, 2002 (GB) ............................................ 0210448

(51) Int. Cl.[7] ........................... B05B 7/30; B05B 11/04; A01G 25/14; B01D 17/00

(52) U.S. Cl. ....................... 239/346; 239/345; 239/328; 239/375

(58) Field of Search ................................ 239/291, 328, 239/345, 346, 375, 376; 222/541.1

(56) References Cited

U.S. PATENT DOCUMENTS

| | | | | |
|---|---|---|---|---|
| 1,703,384 A | | 2/1929 | Birkenmaier | |
| 2,177,032 A | | 10/1939 | Baumgardner | |
| 2,200,675 A | * | 5/1940 | Northcutt | 137/264 |
| 2,264,564 A | | 12/1941 | Connor | |
| 2,310,633 A | * | 2/1943 | Heimburger | 239/335 |
| 2,959,358 A | * | 11/1960 | Vork | 239/330 |
| 3,198,438 A | | 8/1965 | Hultgren | |

(Continued)

FOREIGN PATENT DOCUMENTS

| | | |
|---|---|---|
| AU | 200032550 A | 7/2000 |
| AU | 199935838 A | 1/2001 |
| CA | 963436 | 2/1975 |
| CA | 965388 | 4/1975 |
| CA | 1006450 | 3/1977 |
| CA | 1192852 | 9/1985 |
| CA | 2099763 | 7/1992 |
| CH | 540159 A | 8/1973 |
| CH | 653574 | 1/1986 |
| CH | 688082 A5 | 5/1997 |
| DE | 534 273 C | 9/1931 |
| DE | 27 32 049 | 1/1978 |

(Continued)

OTHER PUBLICATIONS

Service Bulletin, SB–4–043–D, Replaces SB–4–043–C, DeVilbiss, "120175 (GFC–502) 32 OZ. Aluminum Gravity Feed Cup with Disposable Lid and Cup Liner", May, 2000. (*53022).

*Primary Examiner*—William C. Doerrler
(74) *Attorney, Agent, or Firm*—Pamela L. Stewart

(57) ABSTRACT

A paint reservoir has an outlet connectable to a spray gun for transferring paint from the reservoir to the spray gun in use. The outlet is provided with a valve device for opening and closing the outlet to control flow of paint from the reservoir. The valve device has an outer sleeve axially slidable on a spout between a retracted position in which the outlet is closed and an extended position in which the outlet is open. The spout is integral with a lid of the reservoir and the sleeve is a push fit in an adapter for attaching the reservoir to a spray gun. The sleeve is provided with support arms for retainer hooks engageable with the adapter to releasably secure the reservoir to the spray gun.

4 Claims, 12 Drawing Sheets

U.S. PATENT DOCUMENTS

| | | | | | |
|---|---|---|---|---|---|
| 3,211,324 | A | | 10/1965 | Sapien | |
| 3,236,459 | A | | 2/1966 | McRitchie | |
| 3,255,972 | A | | 6/1966 | Hultgren et al. | |
| 3,401,842 | A | | 9/1968 | Morrison | |
| 3,432,104 | A | | 3/1969 | Kaltenbach | |
| 3,507,309 | A | | 4/1970 | Johnson | |
| 3,606,092 | A | * | 9/1971 | Kollmai | 222/144.5 |
| 3,757,718 | A | | 9/1973 | Johnson | |
| 3,780,950 | A | | 12/1973 | Brennan | |
| 3,784,039 | A | | 1/1974 | Marco | |
| 3,790,017 | A | | 2/1974 | Fitzpatrick et al. | |
| 3,790,021 | A | | 2/1974 | Bailey | |
| 4,043,510 | A | | 8/1977 | Morris | |
| 4,122,973 | A | | 10/1978 | Ahern | |
| 4,151,929 | A | | 5/1979 | Sapien | |
| 4,321,922 | A | | 3/1982 | Deaton | |
| 4,339,046 | A | | 7/1982 | Coen | |
| 4,347,948 | A | | 9/1982 | Hamada et al. | |
| 4,379,455 | A | | 4/1983 | Deaton | |
| 4,383,635 | A | | 5/1983 | Yotoriyama | |
| 4,403,738 | A | * | 9/1983 | Kern | 239/313 |
| 4,406,406 | A | | 9/1983 | Knapp | |
| 4,558,792 | A | | 12/1985 | Cabernoch et al. | |
| 4,562,965 | A | | 1/1986 | Ihmels et al. | |
| 4,586,628 | A | | 5/1986 | Nittel | |
| 4,657,151 | A | | 4/1987 | Cabernoch | |
| 4,723,712 | A | | 2/1988 | Egli et al. | |
| 4,760,962 | A | | 8/1988 | Wheeler | |
| 4,811,904 | A | | 3/1989 | Ihmels et al. | |
| 4,813,556 | A | | 3/1989 | Lawrence | |
| 4,836,764 | A | | 6/1989 | Parkinson | |
| 4,936,511 | A | * | 6/1990 | Johnson et al. | 239/346 |
| 4,951,875 | A | | 8/1990 | Devey | |
| 4,971,251 | A | | 11/1990 | Dobrick et al. | |
| 5,052,623 | A | | 10/1991 | Nordeen | |
| 5,094,543 | A | | 3/1992 | Mursa | |
| 5,143,242 | A | | 9/1992 | Millasich | |
| 5,143,294 | A | | 9/1992 | Lintvedt | |
| 5,186,828 | A | | 2/1993 | Mankin | |
| 5,209,501 | A | | 5/1993 | Smith | |
| 5,248,096 | A | * | 9/1993 | Hoey et al. | 239/272 |
| 5,328,095 | A | | 7/1994 | Wickenhaver | |
| 5,337,921 | A | | 8/1994 | Wilson et al. | |
| 5,385,251 | A | | 1/1995 | Dunn | |
| 5,405,090 | A | * | 4/1995 | Greene et al. | 239/708 |
| 5,424,086 | A | | 6/1995 | Walker | |
| 5,454,488 | A | | 10/1995 | Geier | |
| 5,460,289 | A | | 10/1995 | Gemmell | |
| 5,492,242 | A | | 2/1996 | Gall | |
| 5,582,350 | A | | 12/1996 | Kosmyna et al. | |
| 5,607,082 | A | | 3/1997 | Cracauer | |
| 5,617,972 | A | | 4/1997 | Morano et al. | |
| 5,655,714 | A | | 8/1997 | Kieffer et al. | |
| D386,654 | S | | 11/1997 | Kosmyna | |
| 5,713,519 | A | * | 2/1998 | Sandison et al. | 239/8 |
| 5,772,079 | A | | 6/1998 | Gueret | |
| 5,789,684 | A | | 8/1998 | Masek et al. | |
| 5,797,520 | A | | 8/1998 | Donahue | |
| 5,806,711 | A | | 9/1998 | Morano et al. | |
| 5,816,501 | A | | 10/1998 | LoPresti et al. | |
| 5,829,588 | A | | 11/1998 | Bloomfield | |
| 5,853,102 | A | | 12/1998 | Jarrett | |
| 5,996,427 | A | | 12/1999 | Masek et al. | |
| 6,019,294 | A | | 2/2000 | Anderson et al. | |
| 6,053,429 | A | | 4/2000 | Chang | |
| 6,092,740 | A | | 7/2000 | Liu | |
| 6,196,410 | B1 | | 3/2001 | Hocking | |
| 6,257,429 | B1 | | 7/2001 | Kong | |
| 6,536,687 | B1 | * | 3/2003 | Navis et al. | 239/345 |
| 6,595,441 | B2 | * | 7/2003 | Petrie et al. | 239/345 |
| 6,820,824 | B1 | | 11/2004 | Joseph et al. | |

FOREIGN PATENT DOCUMENTS

| | | | | |
|---|---|---|---|---|
| DE | 2900998 | | | 7/1980 |
| DE | 29 44 653 | A | | 5/1981 |
| DE | 34 09 961 | A1 | | 9/1985 |
| DE | 3439442 | | | 4/1986 |
| DE | 35 17 122 | C | | 5/1986 |
| DE | 4102326 | | | 7/1992 |
| DE | 4209258 | A1 | | 9/1993 |
| DE | 19618514 | A1 | | 11/1997 |
| DE | 29905100 | U1 | | 6/1999 |
| DE | 201 17 496 | U1 | | 2/2002 |
| EP | 0 300 762 | | | 1/1989 |
| EP | 0 536 344 | | | 4/1993 |
| EP | 636548 | B1 | | 2/1995 |
| EP | 0 678 334 | | | 10/1995 |
| EP | 0 689 825 | A1 | | 1/1996 |
| EP | 0 847 809 | A1 | | 6/1998 |
| EP | 0 987 060 | A1 | | 3/2000 |
| FR | 433 879 | A | | 1/1912 |
| FR | 2 510 069 | | | 1/1983 |
| FR | 2639324 | | | 5/1990 |
| FR | 2 669 306 | | | 5/1992 |
| FR | 2669306 | | * | 5/1992 |
| GB | 2103173 | | | 2/1983 |
| GB | 2 170 471 | | | 8/1986 |
| JP | 01027659 | A | * | 1/1989 |
| JP | 01 027659 | A | | 1/1989 |
| JP | SHO 64-27659 | | | 1/1989 |
| JP | HEI 6-335643 | | | 12/1994 |
| JP | 08192851 | A | | 7/1996 |
| JP | 10007170 | A | | 1/1998 |
| JP | 11028394 | | | 2/1999 |
| JP | 2001252599 | | | 9/2001 |
| SU | 1088812 | | | 4/1984 |
| WO | WO92/11930 | | | 7/1992 |
| WO | WO 92/14437 | | | 9/1992 |
| WO | WO 95/11170 | A1 | | 4/1995 |
| WO | WO98/32539 | | * | 7/1998 |
| WO | WO 98/32539 | | | 7/1998 |
| WO | WO 99/06301 | A1 | | 2/1999 |
| WO | WO 99/50153 | A1 | | 10/1999 |

* cited by examiner

VALVE CLOSURE FOR SPRAY GUN RESERVOIR

This application claims priority to United Kingdom Application No. 0210448.7, filed May 8, 2002.

FIELD

This invention concerns improvements in or relating to liquid spraying apparatus. The invention has particular, but not exclusive, application to spray guns for spraying liquids such as paint, lacquer or similar coating materials. More especially, the present invention concerns a reservoir having an outlet connectable to a spray gun for transferring liquid in the reservoir to the spray gun.

BACKGROUND

Spray guns are widely used in vehicle body repair shops when re-spraying a vehicle that has been repaired following an accident. In the known spray guns, the paint is fed to a spray nozzle from a reservoir attached to the gun. On emerging from the spray nozzle, the paint is atomised and forms a spray with compressed air supplied to the nozzle. The paint may be gravity fed or, more recently, pressure fed by an air bleed from the compressed air line into the reservoir.

A typical reservoir consists of a paint pot having an outlet in the bottom of the pot that is attached to the spray gun and a removable cap at the top by means of which paint can be introduced into the pot for delivery to the spray gun.

With this arrangement, the spray gun and pot have to be thoroughly cleaned when changing the paint in the reservoir to avoid cross-contamination which may adversely affect the finish. This is especially important when spraying part of a vehicle to match exactly the colour of the existing colour of the adjacent bodywork.

Cleaning is time consuming and involves the use of solvents that can give rise to health and/or safety hazards. A typical finish may require application of a primer, base coat and a clear lacquer. The spray gun and pot may therefore have to be cleaned several times when carrying out a single repair and this increases considerably exposure of the operator to the health and safety risks associated with such cleaning.

Furthermore, cleaning adds significantly to the repair costs in terms of both the working time lost while the spray gun and pot are being cleaned and the costs of the cleaning materials themselves and/or any paint remaining in the pot that is thrown away.

In order to reduce the amount of cleaning and to facilitate changeover from one paint to another, we have previously proposed in WO 98/32539 an arrangement in which a paint pot is provided with a separate, open-topped liner for the paint to be dispensed. The liner is a close fit in the pot and is closed by a separate lid that has the outlet for releasable connection to the spray gun.

In use, the liner collapses as paint is withdrawn and, after spraying, the liner and lid can be removed allowing a new, clean liner and lid to be employed for next use of the spray gun. As a result, the amount of cleaning required is considerably reduced and the spray gun can be readily adapted to apply different paints in a simple manner.

This has considerable benefits for the user. In particular, efficiency is improved by reducing the amount of working time lost while changing over the spray gun to spray another paint and exposure of the operator to the potential health and safety risks associated with the cleaning operation are lessened by reducing the amount of cleaning materials required. This can result in cost savings for the user.

A problem can arise, however, if there is any paint remaining in the liner when the lid/liner assembly is removed from the paint pot. It is often not practical to transfer any unused paint from the liner to a storage container and throwing the lid/liner assembly away with unused paint is wasteful and a potential health/safety hazard from leakage of the paint.

Storage of any unused paint in the liner is possible by temporarily closing the outlet in the lid, for example with a cap. This may allow the liner and lid to be re-fitted in the paint pot for use of the remaining paint. However, this is generally only suitable for short term storage of up to a few hours. Thus, over a longer period of time, the cap may become stuck to the lid by drying paint making removal of the cap difficult or preventing removal altogether. In addition, there is a risk of contamination of the paint by flakes of dried paint breaking away and falling into the paint if the cap is forcibly released.

Further problems for long term storage of unused paint result from the instability of the liner/lid assembly when the liner is in a collapsed condition and from the susceptibility of the fragile liner/lid assembly to damage if dropped or otherwise mishandled. Thus, there is a risk of leakage, spillage of paint if the lid and liner become separated making storing and handling of the liner/lid assembly for any appreciable time complicated.

SUMMARY

The present invention has been made from a consideration of the foregoing problems and disadvantages of the known paint reservoirs. In particular, the present invention seeks to provide a reservoir for use with a spray gun that can also serve to store paint therein.

Thus, the presents invention provides a closure system for an outlet of the reservoir that is connectable to a spray gun whereby the outlet can be opened and closed in a reliable manner.

More specifically, the present invention provides a closure system that enables any unused paint remaining in the reservoir at the end of the working day and/or when changing over the paint to be sprayed to be stored in the reservoir for later use when re-attaching the reservoir to the spray gun.

For convenience, the term "paint" will be used hereinafter but it will be understood all forms of flowable materials that can be applied using a spray gun (whether or not they are intended to colour the surface) including (without limitation) primers, base coats, lacquers, varnishes and similar paint-like materials as well as other materials such as adhesives, sealants, fillers, putties, powder coatings, blasting powders, abrasive slurries, mould release agents and foundry dressings which may be applied in atomised or non-atomised form depending on the properties and/or the intended application of the material are included within the scope of this invention and the term "paint" is to be construed accordingly.

Advantageously, in certain embodiments, the present invention provides a closure system that can be operated when the reservoir is connected to the spray gun.

Advantageously, in certain embodiments, the present invention provides a closure system for a reservoir that can be supplied empty or pre-filled.

According to one aspect, the present invention provides a reservoir for use with liquid spraying apparatus, the reservoir having an outlet connectable to liquid spraying apparatus and a valve device for opening and closing the outlet.

For convenience, the invention will be described hereinafter with reference to use of the reservoir with a spray gun but it will be understood that the invention is not limited to such use that the reservoir may be used with other types of liquid spraying apparatus.

By providing the reservoir with the valve device, the invented reservoir can be attached to a spray gun with the outlet closed to prevent spillage and the outlet opened to allow paint to be fed to the spray gun. On completion of spraying, the outlet can be closed again and the reservoir removed to prevent spillage.

Any unused paint remaining when the reservoir is detached can be stored in the reservoir with the outlet closed to prevent contamination/degradation of the paint and the reservoir can later be re-attached to use the paint.

As a result, the invented reservoir reduces wastage by allowing the paint to be used in one or more spraying operations and provides storage for any unused paint between spraying operations while detached from the spray gun. This may produce cost savings, especially when the reservoir contains a standard paint mix that may be used for more than one repair.

A further advantage of providing the valve device is that the reservoir can be inverted with the outlet closed for attaching the reservoir to a spray gun in its normal upright position without risk of spillage and the outlet can then be opened to commence spraying. Furthermore, the outlet may be closed at any time and the reservoir detached from the spray gun in its normal upright condition without risk of spillage for disposal of the reservoir or storage of any unused paint in the reservoir for future use.

In this way, connection and removal of the reservoir can be achieved in a safe, reliable manner that does not require the spray gun to be inverted to prevent spillage of paint from the reservoir.

Preferably, the reservoir is disposable so that it can be thrown away when all the paint has been used or when any remaining paint is no longer required. By employing a disposable reservoir, only the spray gun and any connector for securing the reservoir needs to be cleaned when changing the paint to be sprayed.

In this way, set-up times are reduced and exposure of operators to cleaning materials (solvents) is reduced. This may produce further cost savings from increased efficiency and reduce the health and safety risks for the operator.

In a preferred arrangement, the reservoir is collapsible as paint is being withdrawn for supply to the spray gun. Preferably, the reservoir is collapsible in an axial direction from a base end towards the outlet when liquid is withdrawn from the reservoir. In this way, transfer of paint from the reservoir is assisted and the reservoir can be collapsed to a compact configuration for disposal after use.

The reservoir may have an attachment portion in which the outlet is provided for connection to the spray gun and a collapsible portion for preventing formation of a vacuum as paint is withdrawn from the reservoir in use. In one arrangement, the reservoir may be of the type disclosed in WO 98/32539 wherein the collapsible portion is an open-topped liner for an outer pot to support the liner and the attachment portion is a lid arranged to close the liner and secured by a locking collar to provide a fluid tight compression seal between the lid and liner. Alternatively, or additionally the liner and lid may be mechanically secured together by engagement of interlocking formations to provide a fluid tight seal therebetween with the locking collar securing the lid/liner assembly in the outer pot.

In this way, the lid/liner can be removed and replaced by a new, clean lid/liner when changing over the paint to be sprayed without cleaning the reservoir. This arrangement is especially suitable where the end user prepares a paint mix for colour matching to the colour of a vehicle and uses this to fill the reservoir for spraying the vehicle.

In another arrangement, the attachment portion and collapsible portion may be permanently secured together to provide a leak proof seal therebetween. For example, the attachment portion and collapsible portion may be bonded together by adhesive, welding or other suitable means. Alternatively, the attachment portion and collapsible portion may be formed integrally in one piece. For example, the attachment portion and collapsible portion may produced by injection or blow moulding.

In this way, the reservoir may be attached to the spray gun without the outer pot and locking collar mentioned above. This arrangement is especially suitable where the reservoir is supplied to the end user pre-filled so the user only has to attach the reservoir to the spray gun for spraying a vehicle.

In a particularly preferred arrangement, the attachment portion defines an internal surface of the reservoir and the collapsible portion is arranged to conform substantially to the internal surface of the attachment portion in a collapsed condition of the reservoir. This prevents pockets being formed between the collapsible portion and the internal surface in which paint may be trapped. As a result, substantially all the paint can be discharged in the fully collapsed condition of the reservoir.

The collapsible portion may be in the form of an elastic or extensible diaphragm that stretches to conform to the internal surface of the attachment portion as paint is withdrawn from the reservoir. Alternatively, the collapsible portion may be in the form of an inelastic or inextensible diaphragm that is arranged to be reversible between an extended position spaced from the internal surface and a collapsed position overlying the internal surface. For example, the diaphragm may be a mirror image of the internal surface in the extended position.

Pre-filling may advantageously be employed for paints (or other liquids as herein defined) that can be packaged and stored until required without degrading. Thus, pre-filling may be especially useful for liquids that can be supplied ready to use (i.e. without requiring modification to match the colour to an existing colour). For example, base coats in standard colours of a specified shade and/or primers or lacquers that can be supplied in a non-activated form and activated (if necessary) by suitable means such as by exposure to a source of light (ultraviolet) or electrical energy when required.

Advantageously, the valve device is incorporated in the fluid outlet and the fluid outlet is adapted for releasable connection to the spray gun via the valve device. For example, the valve device may comprise coaxial inner and outer members that are relatively movable in an axial direction to open and close the outlet.

The inner member may be in the form of a spout and the outer member may be in the form of a sleeve slidable on the spout to open and close the outlet. The spout may have a central plug supported by internal ribs defining ports at the outer end of the spout and the sleeve may have an internal wall at the outer end with a central opening aligned with the plug.

In this way, the plug is received in the opening and the internal wall covers the ports to close the outlet in a retracted position of the sleeve, and the sleeve is axially movable to an extended position in which the opening is clear of the plug and the internal wall uncovers the ports to open the outlet. This provides a construction that is simple to manufacture and is reliable in use.

Preferably, an adapter is provided for connecting the reservoir to a spray gun. The adapter may comprise a tubular body having a screw thread or other suitable means at one end for connection to the spray gun and the sleeve is a push-fit in the other end to provide a fluid-tight seal therebetween. For example, the sleeve may have one or more external sealing ribs co-operable with an internal wall of an opening in the other end of the adapter.

Advantageously, the sleeve is provided with a pair of diametrically opposed retainer hooks for releasable locking engagement with the adapter to prevent axial separation of the sleeve and adapter. In this way, accidental or inadvertent removal of the reservoir from the spray gun is prevented.

The retainer hooks may be engageable to secure the reservoir by push-fit of the sleeve in the adapter and may be connected to the sleeve via respective support arms provided with finger grips or pulls for manually releasing the retainer hooks when it is desired to detach the reservoir. In this way, the reservoir can be connected to and released from the spray gun with a simple action requiring minimum effort or manual dexterity by the user.

With this arrangement, both the actions of attaching and detaching the reservoir from the spray gun tend to maintain the sleeve in its retracted position closing the outlet thereby reducing the risk of spillage when connecting/disconnecting the reservoir with the valve device in its closed position.

Furthermore, when the reservoir is connected to the spray gun, the reservoir can be pulled away from the spray gun to move the sleeve from its retracted position to its extended position thereby opening the outlet and allowing paint to flow to the spray gun. When it is desired to disconnect the reservoir from the spray gun, the reservoir can be pushed towards the spray gun to move the sleeve from its extended position to its retracted position thereby closing the outlet and preventing flow of paint to the spray gun.

The spout may have an external lip at the outer end that is engageable with an axially extending recess in the opposed internal surface of the sleeve to provide a fluid-tight seal for preventing leakage of paint therebetween.

The lip may also be engageable with an internal shoulder at one end of the recess to provide an end stop that defines the extended position of the sleeve and retains the sleeve on the spout. In this way, relative axial movement of the sleeve and spout to open and close the outlet is controlled and the sleeve cannot be pulled off the spout.

Preferably, the spout and sleeve are provided with co-operating axial formations that are engageable to prevent relative rotation between the spout and sleeve. In this way, the sleeve is guided for axial movement on the spout.

The reservoir may include a filter to remove unwanted solid particles from the paint as it is being transferred from the reservoir to the spray gun. The filter may comprise a mesh screen located in the outlet upstream of the valve device. Alternatively, the filter may be dispensed with if filtering of the paint supplied to the spray gun is not required.

Where the reservoir is supplied pre-filled with paint, the outlet may be provided with a tamper evident closure to provide a visual indication to the end user of the integrity of the reservoir prior to first use. Such closure may be in the form of a removable cap that can be re-fitted when the reservoir is detached from the spray gun to cover the outlet. Alternatively, the closure may comprise a tamper evident seal such as a foil strip that covers the outlet and is removed prior to first use.

Where the closure comprises a cap it may provide additional protection against entry of contaminants for storage of un-used paint in the reservoir. The cap may also assist in preventing paint drying in the valve device and locking the valve device in the closed position.

Preferably, the spout of the valve device is formed as an integral part of the reservoir and the sleeve is a push fit on the spout for assembly of the valve device. With this arrangement, the reservoir may be filled through the spout and the sleeve attached to the spout to close the outlet after the reservoir has been filled. In this way, the reservoir may be supplied to the end user pre-filled with the valve device closed ready for attaching to the spray gun.

Alternatively, the reservoir may be supplied empty with the sleeve detached for the end user to fill the reservoir through the spout and attach the sleeve. In this case, the reservoir may be supplied in a collapsed condition and the end user can extend the reservoir from its collapsed condition at the time of use when it is desired to introduce paint to the reservoir. In this way, the space and costs for packing and transportation of the reservoir by the manufacturer and for storage by the end user may usefully be reduced.

In another arrangement, the reservoir may be provided with an inlet separate from the outlet for introducing paint to the reservoir. With this arrangement, the reservoir may be again be supplied pre-filled or empty for filling by the end user.

Where provided, the inlet may be arranged to be accessible when the reservoir is fitted to the spray gun so that, in use, when the reservoir is connected to the spray gun, paint can be added to the reservoir without removing the reservoir from the spray gun.

This may be of benefit if the volume of paint required exceeds the capacity of the reservoir. For example, when painting a large area, the user can simply top-up the reservoir with additional paint as required with the reservoir still attached to the spray gun. As a result, the risk of spillage and/or contamination of the paint is reduced.

It may also be of benefit when applying a finishing clearcoat such as lacquer whereby the addition of thinners (solvent) to the reservoir to reduce the viscosity of the clearcoat for 'fading-out or blending' is made considerably easier.

According to another aspect, the present invention provides a spray gun provided with a reservoir for supplying paint to the spray gun, the reservoir having an outlet releasably connected to the spray gun and a valve device for opening and closing the outlet.

Preferably, the reservoir is connectable to the spray gun with the outlet closed and the outlet can then be opened to allow paint to be transferred to the spray gun. In this way, the reservoir can be inverted for connecting the outlet of the reservoir to an inlet on top of the gun with the gun in its normal upright position without spillage of paint from the reservoir.

In addition, the outlet can be closed to allow the reservoir to be detached from the spray gun without spillage of paint. Any unused paint remaining in the reservoir can be stored with the outlet closed to prevent entry of contaminants and/or degradation of the paint and the reservoir later re-attached to the spray gun for use of the remaining paint.

Preferably, the reservoir is collapsible so that paint can be withdrawn without forming a vacuum that may prevent or reduce the flow of paint from the reservoir. In this way, the reservoir may be employed with both gravity feed and pressure feed spray guns.

For application to gravity feed spray guns, the reservoir may be received in an outer container that protects the reservoir from puncturing and/or assists in controlling collapse of the container in an axial direction. Alternatively, the outer container may be omitted.

For application to pressure feed spray guns, the reservoir is received in an outer container connected via a bleed line to a source of compressed air delivered to the spray gun. The pressure of the air supplied to the outer container acts to assist collapsing of the reservoir as paint is being withdrawn.

According to a still further aspect, the present invention provides a method of connecting a reservoir to a spray gun comprising providing the reservoir with a valve device for opening and closing an outlet, connecting the outlet to a spray gun with the outlet closed, and opening the outlet when connected to the spray gun to allow transfer of paint from the reservoir to the spray gun.

The invention will now be described in more detail, by way of example only, with reference to the accompanying drawings, wherein:

DETAILED DESCRIPTION

Figure 1:
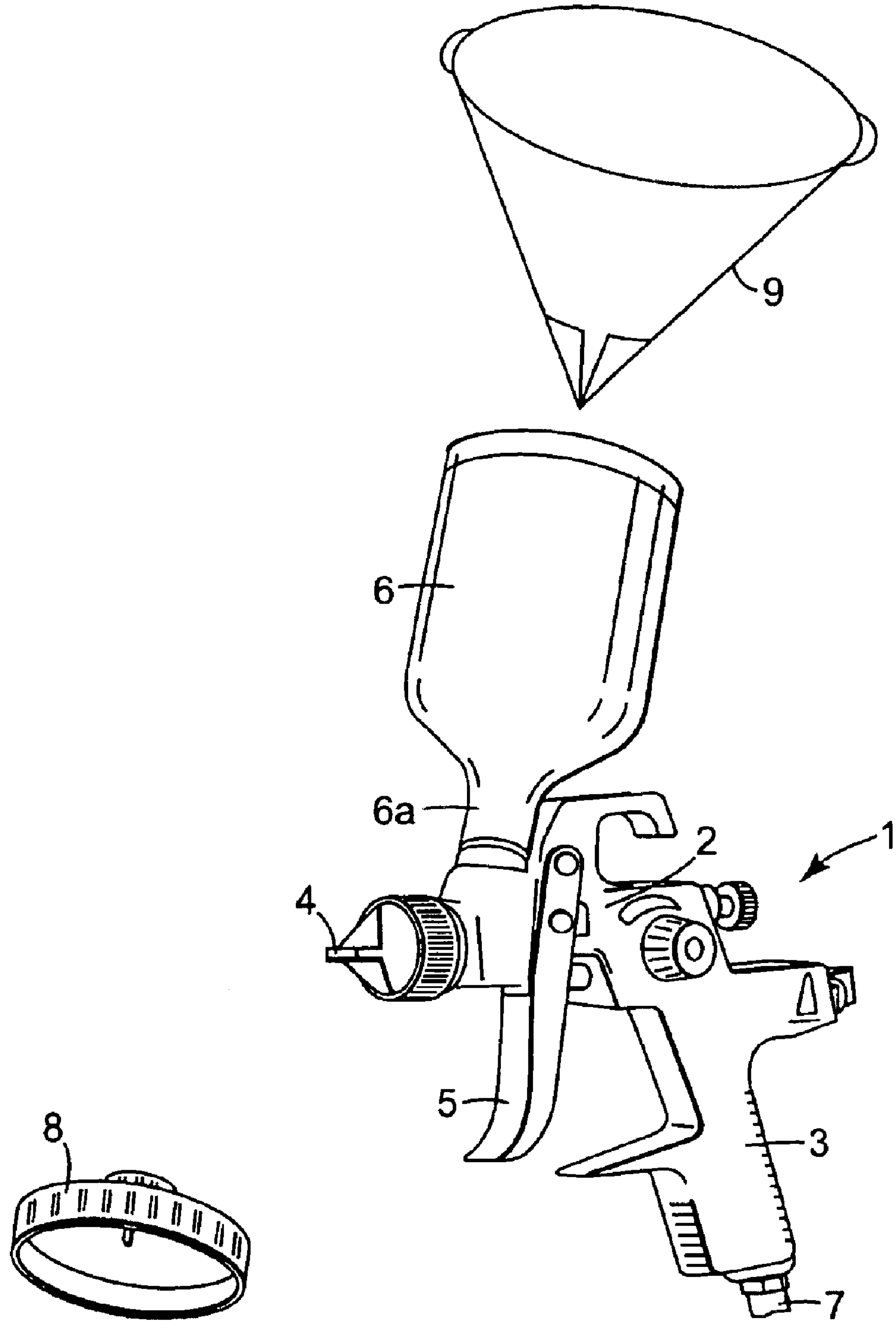
FIG. 1 PRIOR ART
FIG. 1 is a perspective view of a prior art spray gun.

FIG. 1 of the drawings illustrates a typical prior art paint spray gun 1 of the gravity-feed type. The gun 1 comprises a body 2, a handle 3 which extends downwards from the rear end of the body, and a spray nozzle 4 at the front end of the body. The gun is manually operated by a trigger 5, which is pivotally mounted on the sides of the gun.

A paint reservoir 6, or paint pot, is located on the top of the body 2 and has an outlet 6*a* at the lower end and a removable cap 8 at the upper end. The outlet 6*a* communicates with an internal passageway (not visible) which extends through the gun 1 to the nozzle 4. The cap 8 is removable to allow paint to be added to the pot 6 when it is mounted on the spray gun 1.

To ensure that there are no unwanted particles in the paint, which would spoil the finish of the painted surface, the paint is usually poured into the pot 6 through a filter. FIG. 1 shows the cap 8 of the pot 6 removed for this purpose, and a conical filter 9 about to be positioned on the open end of the pot. When the pot 6 has been filled with paint, the filter 9 is removed and discarded. Alternatively, the filter may be of a type that can be cleaned and re-used.

In use, the gun 1 is connected via a connector 7 at the lower end of the handle 3 to a source of compressed air (not shown) so that, when the user pulls on the trigger 5, compressed air is delivered through the gun to the nozzle 4. As a result, paint delivered under gravity from the pot 6 to the nozzle 4 is atomised on leaving the nozzle 4 and forms a spray with the compressed air emerging from the nozzle 4.

The pot 6 can be re-filled by removing the cap 8, placing the filter 9 over the open end and pouring more paint into the pot 6 through the filter 9. At the end of the working day or when it is desired to changeover the paint in the pot 6, both the spray gun 1 and pot 6 have to be thoroughly cleaned to remove all traces of the old paint before the pot 6 can be re-attached to the spray gun 1 and filled with the new paint.

This is time consuming and exposes the user to health and safety risks associated with the cleaning materials employed (typically solvents that give off vapours and are poisonous and inflammable). In addition, any un-used paint remaining in the pot 6 usually has to be thrown away as there is a risk of contamination from entrained particles or other sources if it is returned to the paint mix or transferred to a separate storage container.

Figure 2:
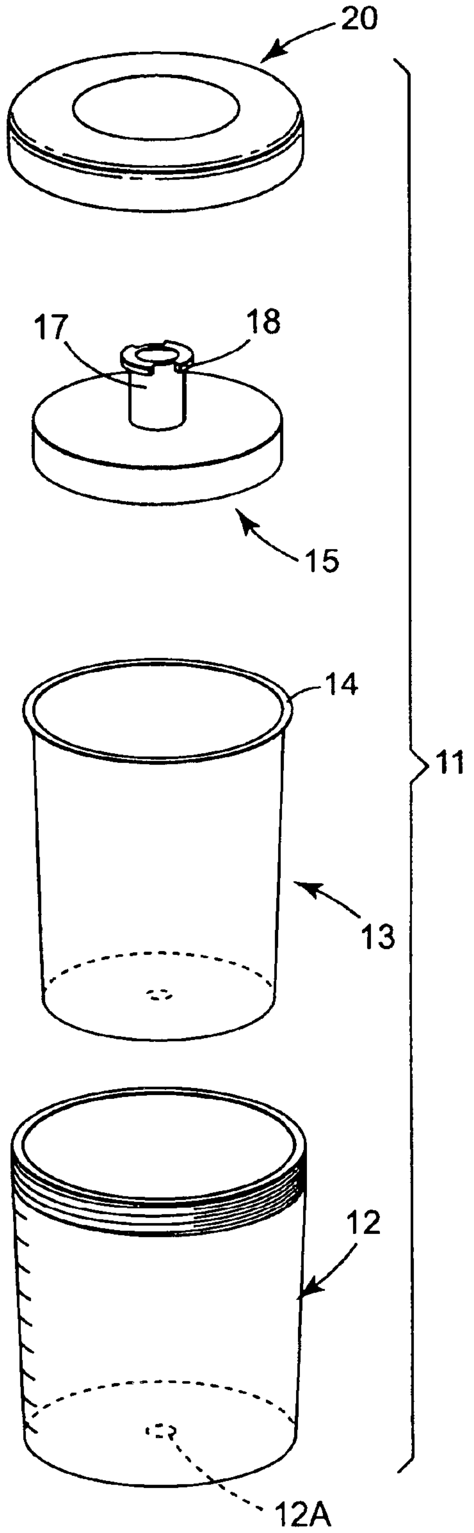
FIG. 2 PRIOR ART
FIG. 2 is an exploded isometric view of the component parts of an alternative paint reservoir for use with the spray gun shown in FIG. 1.
Figure 3:
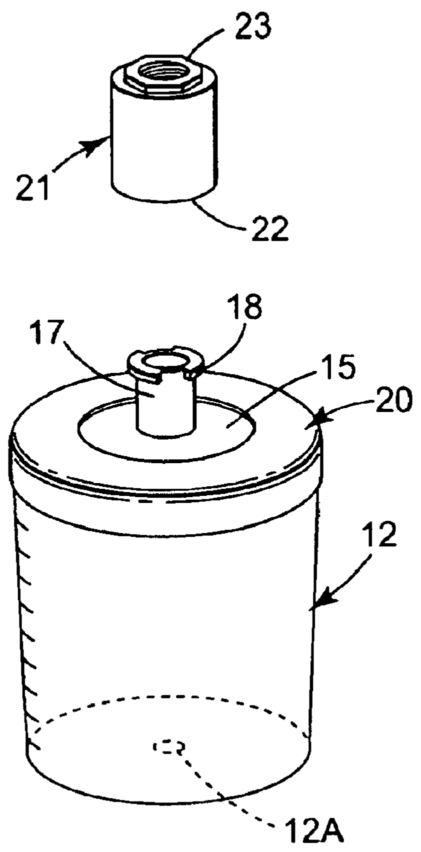
FIG. 3 PRIOR ART
FIG. 3 is a perspective view of the paint reservoir shown in FIG. 2 assembled and an adapter for connecting the reservoir to the spray gun.
Figure 4:
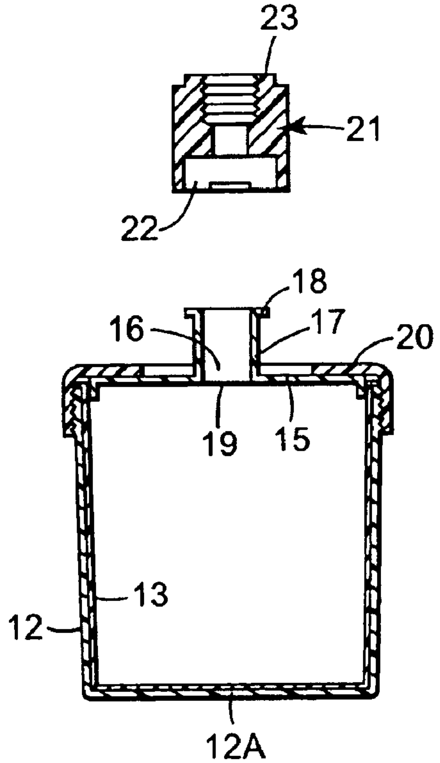
FIG. 4 PRIOR ART
FIG. 4 is a longitudinal section through the paint reservoir and adapter shown in FIG. 3.
Figure 5:
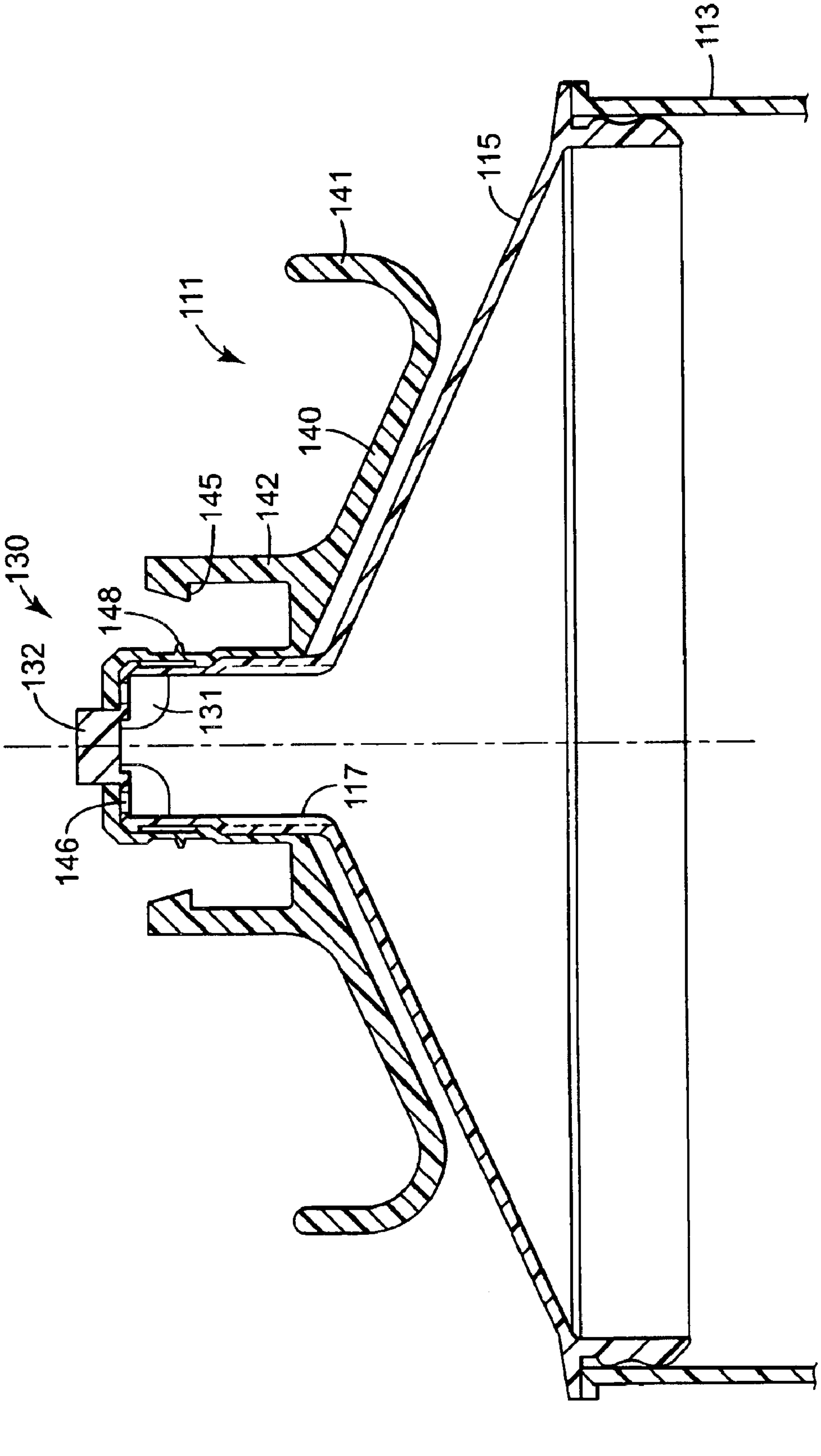
FIG. 5 is a longitudinal section through a first embodiment of a reservoir incorporating a valve device according to the present invention, the valve device being shown closed.

FIGS. 2 to 4 illustrates an alternative reservoir 11 which can be used with the spray gun 1 of FIG. 1 (or any similar gun) instead of the pot 6. The reservoir 11 forms the subject matter of afore-mentioned WO 98/32539 the contents of which are incorporated herein by reference and to which the reader is directed for a more detailed explanation.

The reservoir 11 includes an outer pot 12, comparable in size to the pot 6 of spray gun 1. The pot 12 is open at one end and has an air hole 12A in the other (base) end.

A disposable liner 13 corresponds in shape to and is a close fit in the interior of the pot 12. The liner 13 has a narrow rim 14 at the open end that sits on the top edge of the pot 12.

A disposable lid 15 is a push-fit in the open end of the liner 13 and the lid/liner assembly is secured to the pot 6 by an annular locking collar 20 that screws onto the pot 12.

The lid 15 has a central aperture 16 from which extends a connector spout 17 provided, at its end, with outward extensions 18 forming one part of a bayonet connection. The aperture 16 is covered by a filter mesh 19 which may be a push fit into the aperture 16 or may be an integral part of the lid 15.

The liner 13 and lid 15 are typically made of plastics materials compatible with the paint, for example polyethylene terephthalate (PET), polyamide polypropylene or polyethylene, by moulding or any other suitable method. The lid 15 is relatively rigid for connection to the spray gun 1 and the liner 13 is of reduced thickness capable of collapsing as paint is withdrawn from the reservoir 11 in use.

The reservoir 11 is attached to the spray gun 1 by means of an adapter 21 (see FIGS. 3 and 4). The adapter 21 is a tubular component formed internally at one end 22 with the other part of the bayonet connection for attachment to the connector spout 17 of the lid 15. The other end 23 of the adapter 21 is shaped to match the standard attachment to the spray gun 1 (typically a screw thread).

In use, the liner 13 is positioned in the pot 12 and paint is poured in through a filter (not shown) as described previously. The lid 15 is then positioned over the open end and secured by the locking collar 20. The spray gun 1 is then inverted from its normal operating position to enable the reservoir 11 to be attached by means of the co-operating bayonet formations of the connector spout 17 and adapter 21. In this way, leakage of the paint from the reservoir 11 through the open connector spout 17 which forms an outlet for delivering filtered paint to the spray gun 1 in its normal operating position is avoided.

During operation of the spray gun 1, the liner 13 collapses as the paint is withdrawn. On completion of spraying, the spray gun 1 is again inverted from its normal operating position to allow paint to drain from the spray gun 1 back into the reservoir 11. The reservoir 11 is then detached with connector spout 17 uppermost to prevent spillage of any un-used paint from the reservoir 11. The liner/lid assembly can then be removed from the pot 12 and the spray gun 1 cleaned and set up to spray a new paint by the use of a new disposable lid/liner assembly as described above.

In this way, it is not necessary to clean the pot 12 at the end of the working day and/or when changing over the paint to be sprayed. As a result, the amount of cleaning is significantly reduced compared to the use of the pot 6 described with reference to FIG. 1.

The collapsed lid/liner assembly removed from the pot 12 can be thrown away. Alternatively, a separate detachable closure cap (not shown) may be provided for attaching to the connector spout 17 to close the outlet for storage of any unused paint remaining in the liner 13. In this way, the lid/liner assembly can later be re-attached to the spray gun 1 to use the stored paint.

This arrangement is generally only suitable for short term storage of any unused paint for a few hours. Thus, over a longer period of time, the cap may become bonded to the connector spout 17 if there is paint present between the cap and the spout 17 that hardens over time. This may prevent removal of the cap or result in contamination of the paint by flakes of dried paint breaking off and falling into the reservoir if the cap is forcibly removed.

Furthermore, the lid/liner assembly is only held together by compression fit of the lid and may come apart spilling paint if dropped or handled roughly. Careful handling is therefore required to maintain the integrity of the lid/liner assembly when removed from the pot 12 for storage of any unused paint for later use.

As a result of these problems, the collapsed lid/liner assembly is unsuitable for long term storage of unused paint and the lid/liner assembly is often thrown away with unused paint. This can be wasteful and may present a health/safety hazard from escape of the unused paint to the environment.

Referring now to FIGS. 5 to 11 of the accompanying drawings, there is shown a first embodiment of the present invention in which like reference numerals in the series 100 are used to indicate parts corresponding to the lid/liner assembly shown in FIGS. 2 to 4.

In this embodiment, the lid 115 is provided with a valve device 130 for controlling flow of paint from the reservoir 111. The valve device 130 is shown closed in FIG. 5 to seal the reservoir 111 and open in FIG. 6 to allow paint to be withdrawn from the reservoir 111.

The lid 115 is of frusto-conical shape with the spout 117 extending from a truncated apex end. A first part of the valve device 130 is formed at the outer end of the spout 117 and comprises a series of circumferentially spaced internal webs or spurs 131 that meet at a central plug 132. The plug 132 is cylindrical and projects above the horizontal plane through the end of the spout 117.

In this embodiment, there are six webs 131 (two only shown) uniformly spaced in the circumferential direction and defining with the plug 132 six ports 146 through which paint can flow in the open condition of the valve device 130. It will be appreciated, however that the number and arrangement of the ports 146 may be varied from that shown.

A second part of the valve device 130 comprises an outer sleeve 133 slidably mounted on the spout 117. The sleeve 133 has an internal wall 134 at the upper end formed with a central opening 135 aligned with the plug 132. The plug 132 is a close fit in the opening 135 in the closed condition of the valve device 130 shown in FIG. 5 in which the wall 134 closes the ports 146 between the plug 132 and webs 131. In this position, the wall 134 prevents flow of paint from the reservoir 111.

Figure 6:
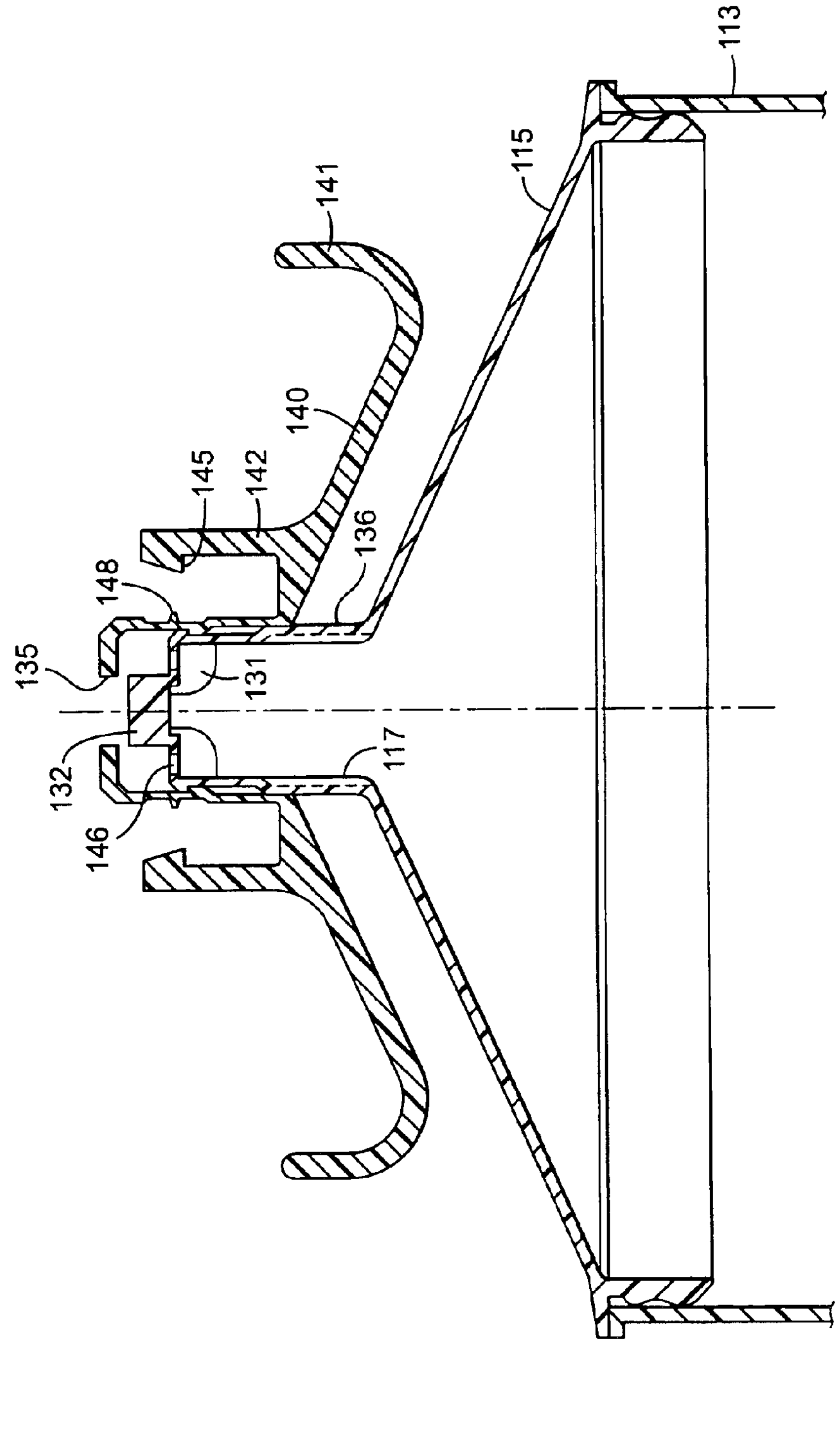
FIG. 6 is a view, similar to FIG. 5, showing the valve device open.
Figure 7:
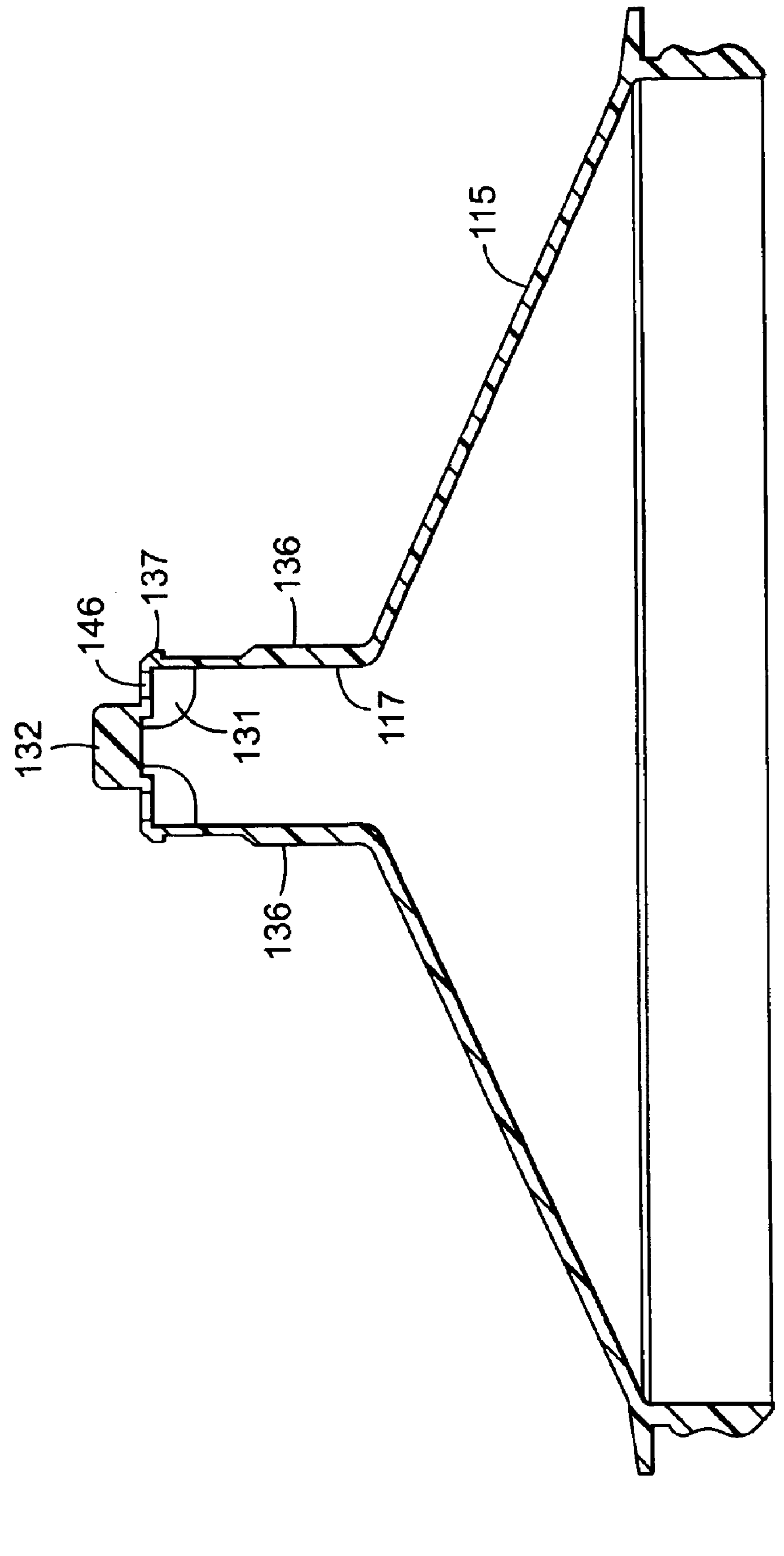
FIG. 7 is a longitudinal section through the lid shown in FIGS. 5 and 6 showing the integral inner spout of the valve device with the outer sleeve of the valve device removed.
Figure 8:
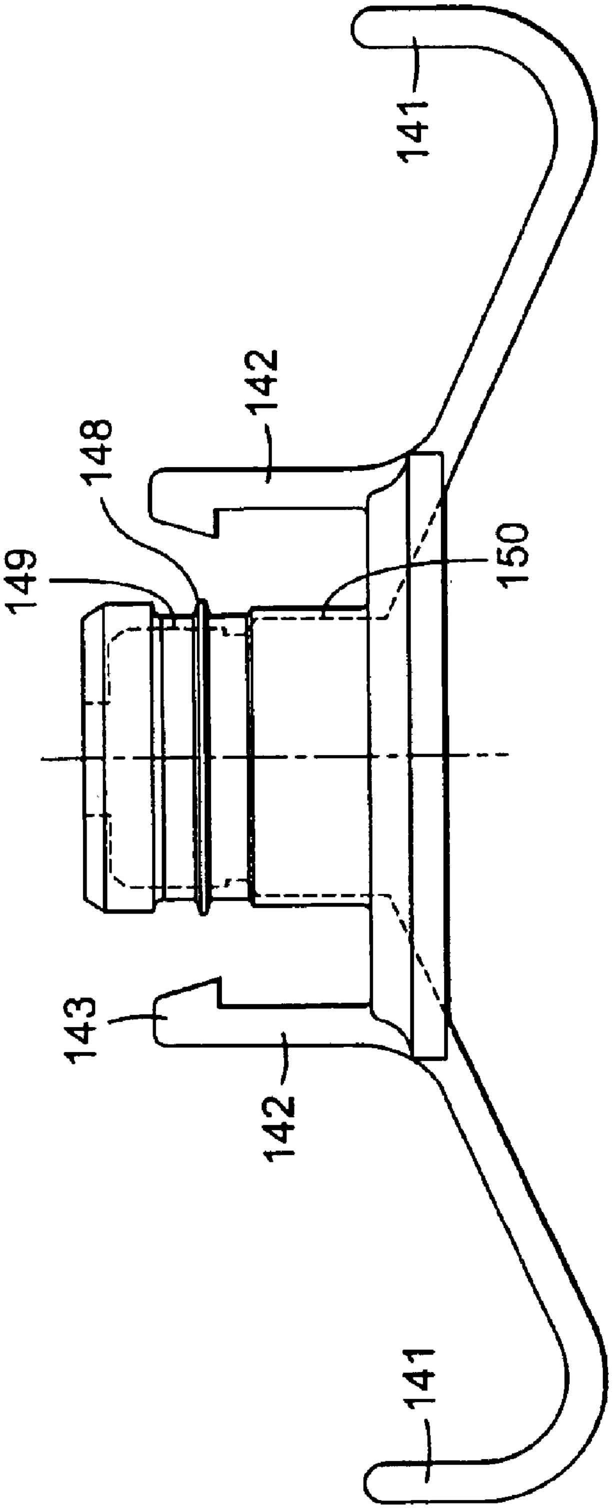
FIG. 8 is a side elevation of the outer sleeve of the valve device shown in FIGS. 5 and 6.
Figure 9:
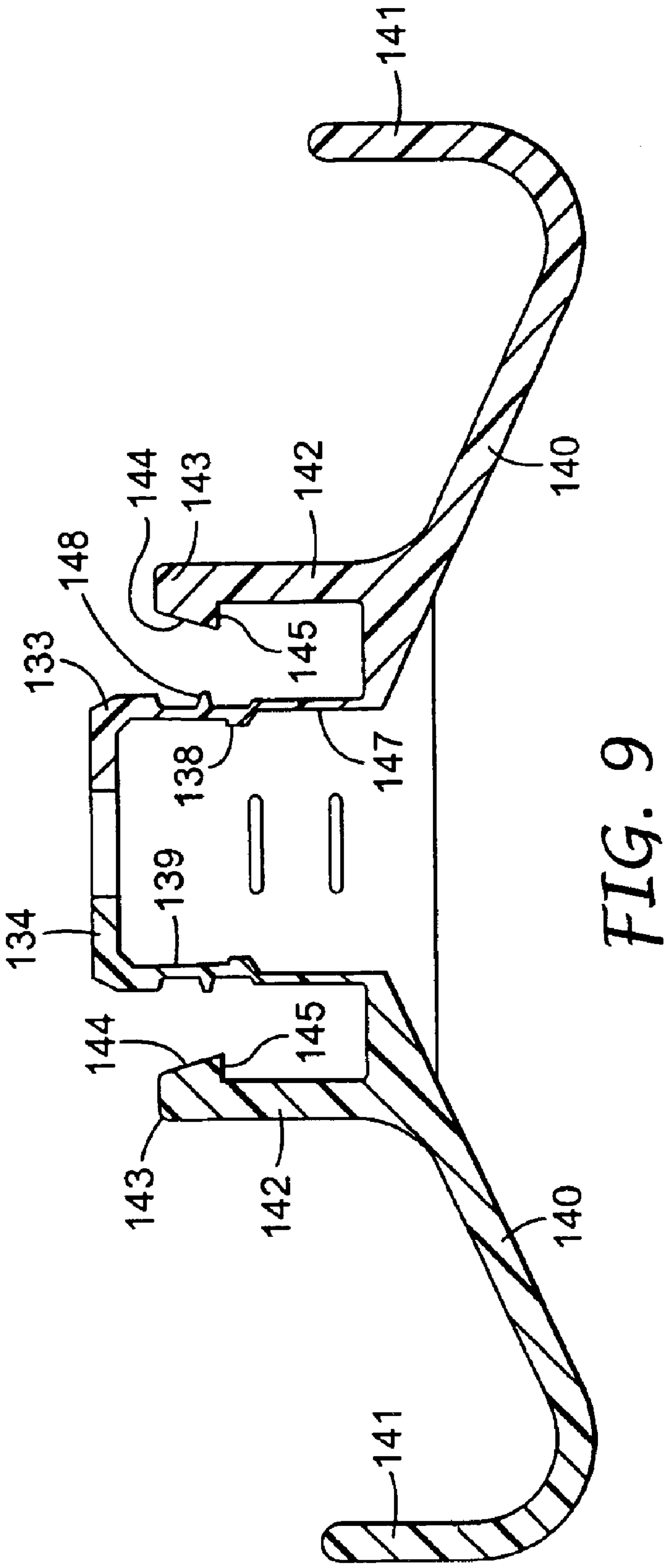
FIG. 9 is a longitudinal section through the outer sleeve of the valve device shown in FIGS. 5 and 6.

The sleeve 133 is axially slidable on the spout 117 to a position in which the central opening 135 of the wall 134 is clear of the plug 132 as shown in FIG. 6. In this position, the valve device 130 is open and paint can flow out of the reservoir 111 via the ports 146 and central opening 135.

The sleeve 133 is prevented from rotating on the spout 117 by engagement of two diametrically opposed axially extending ribs 136 (see FIG. 7) on the outer surface of the spout 117 in complementary axially aligned grooves 147 (see FIG. 9) in the inner surface of the sleeve 133.

The ribs 136 extend from the base of the spout 117 just over half the height and the spout 117 is provided with an external annular lip 137 adjacent the upper end. The grooves 147 extend from the base of the sleeve 133 just over half the height and terminate in an internal shoulder 138 leading to a bore portion 139 of increased diameter.

The annular lip 137 on the spout 117 is a clearance fit in the bore portion 139 and the shoulder 138 is engageable with the lip 137 in the open condition of the valve device 130 shown in FIG. 6 to retain the sleeve 133 on the spout 117. In the closed condition of the valve device 130 shown in FIG. 5, the end wall 134 of the sleeve 133 abuts the outer end of the spout 117.

The sleeve 133 is additionally provided at the lower end with a pair of diametrically opposed arms 140 that extend downwardly generally parallel to the upper surface of the lid 115 and terminate at the outer ends in upwardly curved finger grips or pulls 141.

Each arm 140 is provided with an upstanding retainer hook 142 spaced from the sleeve 133 and terminating at the upper end in a striker head 143 having a chamfer face 144 opposite the sleeve 133 leading to an undercut locking rib 145.

Figure 10:
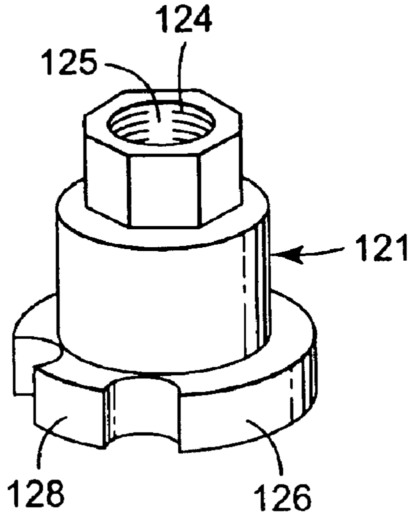
FIG. 10 is a perspective view of an adapter for connecting the reservoir of FIGS. 5 to 9 to a spray gun.
Figure 11:
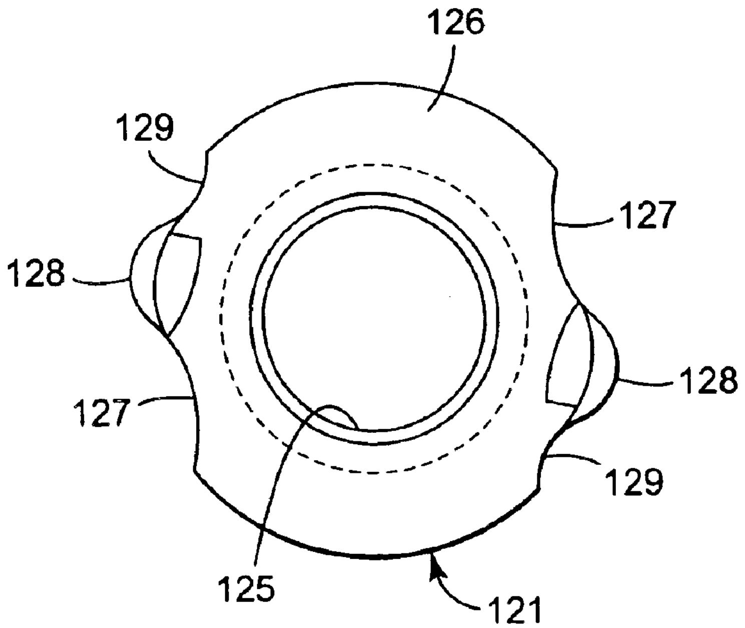
FIG. 11 is a plan view of the adapter shown in FIG. 10.

The sleeve 133 is a push fit in one end of an adapter 121 (see FIGS. 10 and 11). An external annular rib 148 arranged in a recessed portion 149 of the outer surface of the sleeve 133 provides a fluid-tight seal with the adapter 121, and a base portion 150 of the sleeve 133 provides lateral stability between the sleeve 133 and the adaptor 121. The other end of the adapter 121 is provided with a screw thread 124 or other suitable means for releasable connection to the spray gun 1.

In a modification (not shown), the sleeve 133 has a plurality of external annular ribs 148 for sealing engagement with the adaptor 121. In another modification (not shown), the outer surface of the base portion 150 is recessed to provide a plurality of circumferentially spaced axial ribs that provide lateral stability between the sleeve 133 and the adaptor 121. In a preferred arrangement four axial ribs are provided uniformly spaced apart in the circumferential direction.

The adapter 121 has a through bore 125 for transferring paint from the reservoir 111 to the spray gun 1 and is provided with an external collar 126 at one end for releasable engagement with the retainer hooks 142 to secure the reservoir 111.

As best shown in FIG. 11, the collar 126 has major cylindrically concave recesses 127 along opposite sides of its periphery arranged to allow the striker heads 143 of the retainer hooks 142 to pass when the sleeve 133 is pushed into the end of the adapter 121. The reservoir 111 can then be rotated relative to the adapter 121 to cause the retainer hooks 142 to engage convex cam lobes 128 that deflect the hooks 142 outwardly. The lobes 128 lead to minor cylindrically concave recesses 129 and the hooks 142 are received in the recesses 129 to position the locking ribs 145 over the collar 126 to axially retain the reservoir 111 on the adapter 121.

The retainer hooks 142 can be released to remove the reservoir 111 from the adapter 121 by manually gripping the finger grips 141 and pulling the arms 140 towards the lid 115. This causes the retainer hooks 142 to deflect outwardly so as to disengage the locking ribs 145 from the collar 126 of the adapter 121 and allow the sleeve 133 to be pulled out of the adapter 121 to detach the reservoir 111.

In use, the liner 113 is filled with paint, preferably via a filter (not shown), and inserted in the pot 12 as described previously. The lid 115 is then positioned over the open end of the liner 113 with the valve device 130 closed and the lid/liner assembly secured by screwing locking collar 20 onto the pot 12 as described previously.

The adapter 121 is secured to the spray gun 1. The assembled reservoir 111 is then inverted with the valve device 30 closed and is attached to the adapter 121 with the spray gun 1 in its normal upright position without any risk of spillage of paint from the reservoir 111. Alternatively, the adapter 121 may be connected to the reservoir 111 and the adapter 121 then secured to the spray gun 1, again by inverting the reservoir 111 with the valve device 130 closed.

In this way, the spray gun 1 does not have to be inverted when connecting the reservoir 111 to the spray gun 1 thereby facilitating attaching the reservoir 111 to the spray gun 1. In particular, it will be appreciated that inverting and fitting the reservoir 111 from above the spray gun 1 in its normal upright position requires less manual dexterity compared with the embodiment of FIGS. 2 to 4 where the spray gun 1 is inverted and the reservoir 11 fitted from below the spray gun 1 to prevent spillage of the paint from the reservoir, As will also be appreciated, the action of pushing and rotating to lock the reservoir 111 to the adapter 121 maintains the valve device 130 in the closed position shown in FIG. 5. When it is desired to commence spraying, the spout 117 is displaced axially relative to the sleeve 133 by pulling the pot 12 away from the spray gun 1 to move the valve device 130 to the open position shown in FIG. 6. The spray gun 1 can then be operated as described previously and paint is delivered to the spray gun 1 through the open ports 146 in the spout 117 and the opening 135 in the end wall 134 of the sleeve 133.

On completion of spraying, the spray gun 1 can be inverted to drain any paint in the spray gun 1 back into the reservoir 111. The valve device 130 can be returned to the closed position shown in FIG. 5 by pushing the pot 12 towards the spray gun 1 to re-position the plug 132 in the opening 135 and seal the ports 146 in the end of the spout 117. The spray gun 1 can then be returned to its normal, upright position and the reservoir 111 detached from the spray gun 1 by pulling the finger grips 141 towards the lid 115. This causes the arms 140 to deflect and the locking ribs 145 to move outwardly away from the sleeve 133 to disengage the collar 126 of the adapter 121. The reservoir 111 can then be detached by continuing to pull the finger grips 141 to disengage the sleeve 133 from the adapter 121.

As will be appreciated the action of pulling the finger grips 141 to first release the locking ribs 145 from the adapter 121 and then remove the sleeve 133 from the adapter 121 maintains the valve device 130 in the closed position. Furthermore, because the reservoir 111 is detached with the spray gun 1 in its normal upright position, any final drops of paint remaining in the spray gun 1 are prevented from spilling.

When the reservoir 111 is detached from the spray gun 1, the locking collar 20 can be released and the lid/liner assembly removed from the pot 12. The lid/liner assembly can then be put to one side with the valve device 130 closed to store any unused paint for later use if required or thrown away. The pot 12 and collar 20 can then be re-assembled with a new, clean liner/lid containing a different paint and attached to the spray gun 1 after cleaning the spray gun 1 and adapter 121 to remove any traces of the previous paint. When it is desired to re-use the paint, the lid/liner assembly can be re-assembled with the pot 12 and collar 20 and attached to the spray gun 1 as described previously. The valve device 130 can then be opened to allow the paint to be supplied to the spray gun 1.

When storing unused paint in the lid/liner assembly for re-use, the valve device 130 prevents entry of any external contaminants to the paint while it is being stored in the lid/liner assembly. In addition, the exposed parts of the valve device 130 can be wiped clean to remove any traces of paint before they can dry. This avoids a possible source of contamination when it is desired to re-use the stored paint and/or ensures that the valve device 130 can be opened when the lid/liner assembly is re-attached to the spray gun 1.

Figure 12:
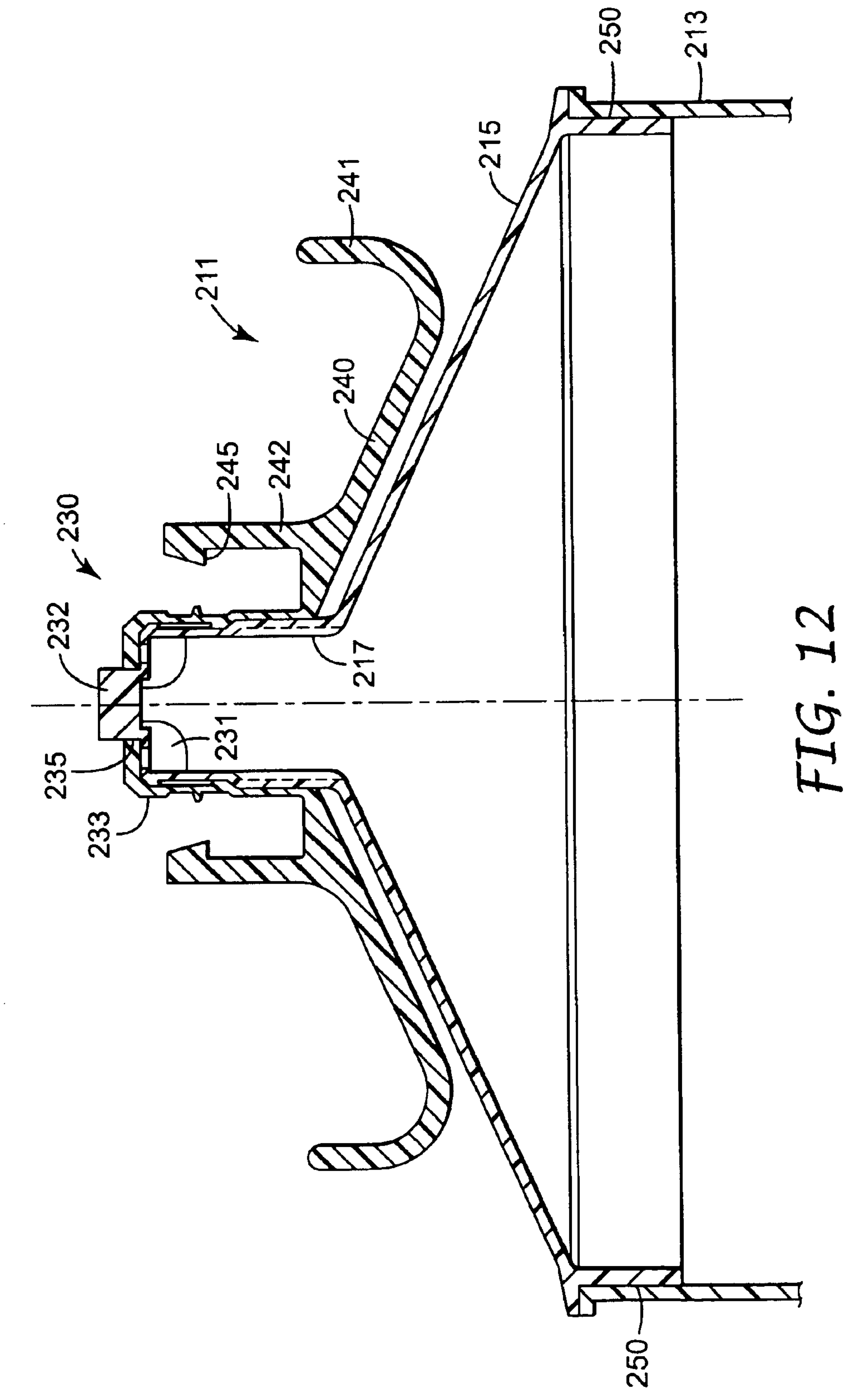
FIG. 12 is a longitudinal section showing a second embodiment of a reservoir according to the present invention.

Referring now to FIG. 12, there is shown a second embodiment of the invention generally similar to the first embodiment in which like reference numerals in the series 200 are used to indicate corresponding parts.

In this embodiment, the liner 213 and lid 215 are permanently attached to each other to form a reservoir 211. For example the lid 215 may be secured around the rim of the liner 213 by adhesive, heat sealing or ultrasonic welding as indicated at 250. In this way, the pot 12 and locking collar 20 for supporting the liner and providing a fluid tight seal between the lid and liner may be dispensed with. For some applications, however, some form of external support for the cylindrical liner 213 may be desirable to provide stability for the reservoir 211 when it is attached to the spray gun 1.

The liner 213 may be filled with paint prior to securing the lid 215 with the valve device 230 in the closed position to prevent spillage/leakage of paint. Alternatively, the lid 215 and liner 213 may be secured together and filled with paint through the spout 217 prior to attaching the sleeve 233 and closing the valve device 230 to prevent spillage/leakage of paint. The pre-filled reservoir 211 can then be supplied for the user to attach to the spray gun 1 as desired.

This may be especially beneficial for the supply of paints having a standard colour. Thus, it will be appreciated, the provision of a pre-filled reservoir that can be attached to and removed from the spray gun one or more times without any additional parts not only reduces setting up times but also reduces wastage by allowing un-used paint to be stored for later use. Alternatively, we may supply the reservoir 211 with the sleeve 233 detached to allow the user to fill the reservoir 211 through the spout 217 and attach the sleeve 233 for assembling the valve device 230 prior to securing the reservoir 211 to the spray gun 1.

When supplying the reservoir 211 pre-filled with paint, a tamper evident closure may be provided for added security against leakage and/or contamination or tampering with the contents of the reservoir during transportation and supply of the reservoir 211 to the end user.

Such closure may be a security cap (not shown) that is secured to the sleeve 233 to cover the plug 232 and opening 235 and is removed when it is desired to connect the reservoir 211 to a spray gun 1. Alternatively, the closure may be a security seal such as a foil strip (not shown) that is attached to the sleeve 233 cover the plug 232 and opening 235 and is removed on first use of the reservoir 211.

Where provided, the cap may be re-attached for added protection against contamination when removing the reservoir 211 to store any unused paint for future use. Such cap may also be provided when supplying the reservoir 211 with the sleeve 233 separate for the user to fill the reservoir 211 and attach the sleeve 233 to assemble the valve device 230.

Figure 13:
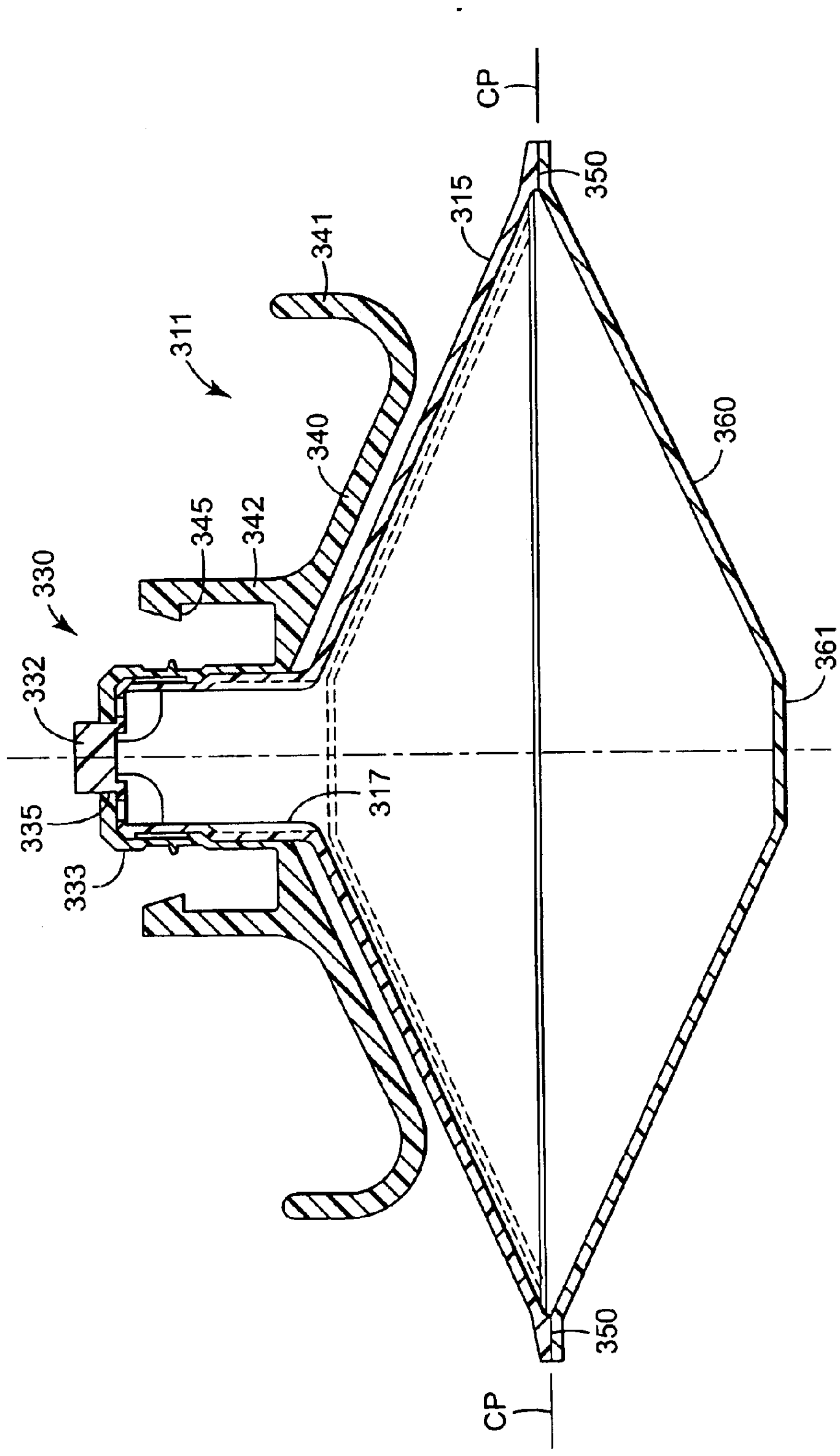
FIG. 13 is a longitudinal section showing a third embodiment of a reservoir according to the present invention.

Referring now to FIG. 13, a third embodiment of the present invention is shown generally similar to the second embodiment in which like reference numerals in the series 300 are used to indicate corresponding parts.

In this embodiment, the cylindrical liner 213 of the previous embodiment is replaced by an inextensible, flexible diaphragm 360. The diaphragm 360 may be formed separately from the lid 315 and permanently attached to the marginal edge of the lid 315 by any suitable means such as adhesive, heat sealing or ultrasonic welding as indicated at 350. For example, the diaphragm 360 may be formed from sheet material that is puncture resistant and impermeable to the paint. Suitable materials include metal foils and polymer films which may be of single or multi-layer construction and may include laminates of metal foils and polymer films.

Alternatively, the diaphragm 360 may be formed integrally with the lid 315. For example, the diaphragm 360 and lid 315 may be formed of plastics material by any suitable means such as injection or blow moulding with the diaphragm 360 being of reduced thickness to provide the required flexibility.

As shown, the diaphragm 360 is of truncated conical shape that generally corresponds to the internal conical shape of the lid 315. The diaphragm 360 is reversible about a central plane CP between an extended position shown in full lines and a collapsed position shown in broken lines. The diaphragm 360 adopts the extended position and provides a substantially flat surface 361 by means of which the reservoir 311 can be stood upright when filled with paint.

In use, the reservoir 311 is detachably attached to a spray gun 1 with valve device 330 closed as described above. The lid 315 is of a size and shape that the user can grip the base end when attaching the reservoir 311 to the spray gun 1. In this way, the paint in the reservoir 311 is not compressed when attaching the reservoir 311 thereby reducing the risk of leaks/spillage.

The valve device 330 is then opened to allow paint to be withdrawn from the reservoir 311 for supply to the spray gun 1. As paint is withdrawn from the reservoir 311, a pressure differential is created across the diaphragm 360 causing it to deform inwardly towards the lid 315. This allows a smooth uninterrupted flow of paint from the reservoir 311 by preventing formation of a vacuum within the reservoir 311.

The diaphragm 360 progressively engages the internal surface of the lid 315 as the paint is being withdrawn until, in the fully collapsed position shown in outline in FIG. 13, the diaphragm 360 is reversed from its original position and conforms substantially to the internal shape of the lid 315. This assists in preventing formation of any pockets within the reservoir 311 that could trap the paint thereby ensuring substantially all the paint can be dispensed if required.

As with the previous embodiment, the reservoir 311 may be supplied pre-filled with paint. Alternatively, the reservoir 311 may be supplied empty with the sleeve 333 separate for the user to fill the reservoir 311 via the spout 317 and then attached to the sleeve 333 to close the valve device 330.

The reservoir 311 may hold sufficient paint for a single application or for multiple applications. The reservoir 311 may be substantially completely filled with the liquid 311 or slightly underfilled to allow the paint to be thoroughly mixed prior to use by massaging the diaphragm 360 or by shaking the reservoir 311 by hand or machine, possibly aided by an internal mixing bearing. This may be advantageous and/or desirable where the reservoir 311 is supplied pre-filled with paint and has been stored for some time before use.

As will be appreciated, the lid 315 and reversible diaphragm 360 provides an arrangement that is more compact and stable compared to the first and second embodiments and which facilitates use of the reservoir 311 without any external support. Thus, when the reservoir 311 is attached to a spray gun 1 and paint is withdrawn, the diaphragm 360 deforms in a controlled manner to conform to the internal shape of the lid 315. A reservoir with a diaphragm that conforms to the internal shape of an attachment portion forms the subject matter of our co-pending UK patent application of even date.

Figure 14:
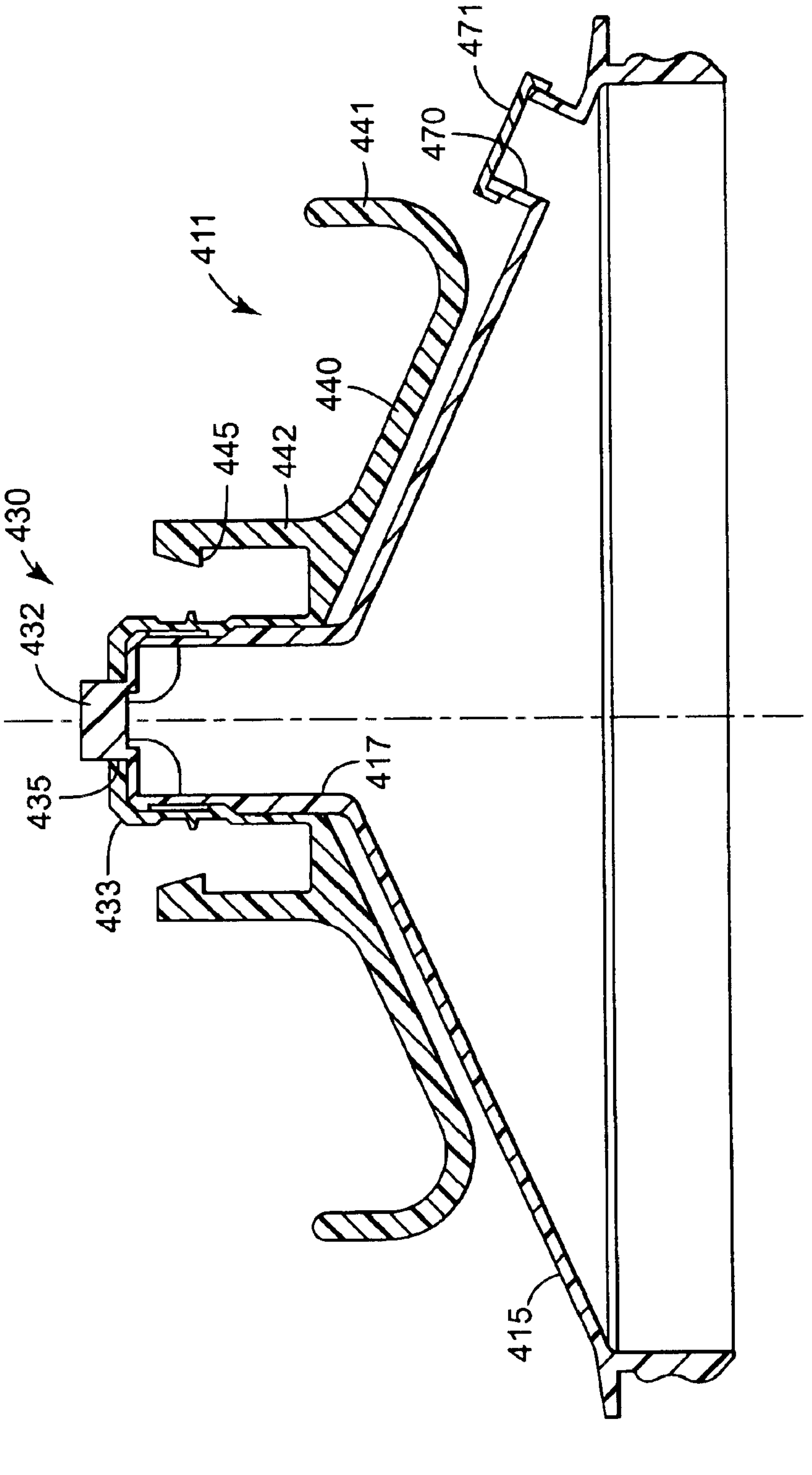
FIG. 14 is a longitudinal section showing a fourth embodiment of a reservoir according to the present invention.

Referring now to FIG. 14, there is shown a fourth embodiment of the present invention generally similar to the previous embodiments in which like reference numerals in the series 400 are used to indicate corresponding parts.

In this embodiment, the reservoir 411 is detachably connectable to a spray gun 1 via valve device 430 as described previously and the lid 415 is provided with a separate filler opening 470 closed by a removable cap 471. This arrangement allows the reservoir 411 to be filled through the opening 470 in the lid 415 either for supply of a pre-filled reservoir 411 to the end user or for the end user to fill with paint as desired.

Where the reservoir 411 is pre-filled for supply to the end user, the cap 471 may be permanently secured after filling to prevent removal for security against tampering with the contents. Alternatively, the cap 471 may be removable to allow the end user to add a component to activate the contents immediately prior to use, for example to add a hardener and/or during use, for example to add thinners.

As will be appreciated, the opening 470 facilitates filling the reservoir 411 where the valve device 430 is provided for releasable connection of the reservoir 411 to the spray gun 1. The opening 470 and cap 471 may be employed in any of the previous embodiments of reservoir shown in FIGS. 5 to 13.

The component parts of the valve device in the exemplary embodiments of the invention described above may be formed of plastics materials, for example polyethylene terephthalate (PET), polyamide, polypropylene or polyethylene, by any suitable method for example injection moulding.

As used herein, the reservoir is described with reference to terms such as "lid" and "liner" or "lid" and "diaphragm". Such terms are used for convenience only and it will be understood that the invention has application to any type or construction of reservoir for attaching to a spray gun or similar spraying apparatus. For example, in the above-described embodiments, the reservoir forms a single chamber or compartment for the paint. However, the reservoir could have internal compartments separated by a rupturable membrane whereby reactive components may be stored separately and mixed prior to use. The reservoir may also be constructed to provide any desired properties or characteristics. Thus the reservoir may be adapted to exclude light or to provide insulation.

As will now be appreciated, the present invention provides a reservoir for paint (or other liquids as herein defined) with a valve device that facilitates attaching the reservoir to and detaching the reservoir from a spray gun with reduced risk of spillage and which enables unused paint to be stored in the reservoir for later use.

In this way, wastage of paint is reduced and the reservoir can be thrown away when empty or any remaining paint is no longer required. The provision of the valve device also has advantages for supply of pre-filled reservoirs that can be attached to the spray gun without any special assembly steps being required thereby reducing set-up times.

The valve device described in the exemplary embodiments of the invention is of simple construction, capable of being manufactured at relatively low cost that is easy to operate and reliable in use. Other constructions of valve device that could be employed in the present invention will be apparent to those skilled in the art and are deemed within the scope of this invention.

It will also be appreciated that the exemplary embodiments described herein are intended to illustrate the diverse range and application of the invention and that features of the embodiments may be employed separately or in combination with any other features of the same or different embodiments.

It will be understood that the invention is not limited thereto and that various modifications and improvements can be made within the spirit and scope of the invention as generally described herein.

What is claimed is:

1. A reservoir for use with a liquid spraying apparatus, the reservoir comprising:

a. an outlet connectable to the liquid spraying apparatus;

b. a valve device for opening and plasma the outlet, wherein the valve device is incorporated in the fluid outlet, and the fluid outlet is adapted for releasable connection to the spraying apparatus via the valve device, wherein the valve device further comprises coaxial inner and outer members that are relatively movable in an axial direction to open and close the outlet, wherein the inner member is in the form of a spout, and the outer member is in the form of a sleeve slidable on the spout to open and close the outlet;

c. an adapter for connecting the reservoir to the spraying apparatus, wherein the adapter comprises a tubular body having a screw thread or other suitable means at one end for connection to the spraying apparatus and the sleeve is a push-fit in the other end to provide a fluid-tight seal therebetween, wherein the sleeve is provide with a pair of diametrically opposed retainer hooks for releasable locking engagement with the adapter to prevent axial separation of the sleeve and adapter, and wherein the retainer hooks are connected to the sleeve via respective support arms provided with finger grips or pulls for manually releasing the retainer hooks to detach the reservoir from the adapter.

2. A reservoir for use with a liquid spraying apparatus, the reservoir comprising:

a. an outlet connectable to the liquid spraying apparatus;

b. a valve device for opening and closing the outlet, wherein the valve device is incorporated in the fluid outlet, and the fluid outlet is adapted for releasable connection to the spraying apparatus via the valve device, wherein the valve device further comprises coaxial inner and outer members that are relatively movable in an axial direction to open and close the outlet, wherein the inner member is in the form of a spout and the outer member is in the form of a sleeve slidable on the spout to open and close the outlet, and wherein the spout has an external lip at the outer end that is engageable with an axially extending recess in the opposed internal surface of the sleeve to provide a fluid-tight seal.

3. A reservoir for use with a liquid spraying apparatus, the reservoir comprising:

a. an outlet connectable to the liquid spraying apparatus;

b. a valve device for opening and closing the outlet, wherein the valve device is incorporated in the fluid outlet and the fluid outlet is adapted for releasable connection to the spraying apparatus via the valve device, wherein the valve device further comprises coaxial inner and outer members that are relatively movable in an axial direction to open and close the outlet, wherein the inner member is in the form of a spout and the outer member is in the form of a sleeve slidable on the spout to open and close the outlet, and the spout has an external lip at the outer end that is engageable with an axially extending recess in the opposed internal surface of the sleeve to provide a fluid-tight seal, and the lip is engageable with an internal shoulder at one end of the recess to provide an end stop that retains the sleeve on the spout.

4. A reservoir for use with a liquid spraying apparatus, the reservoir comprising:

a. an outlet connectable to the liquid spraying apparatus;

b. a valve device for opening and closing the outlet, wherein the valve device is incorporated in the fluid outlet and the fluid outlet is adapted for releasable connection to the spraying apparatus via the valve device, wherein the valve device further comprises coaxial inner and outer members that are relatively movable in an axial direction to open and close the outlet, wherein the inner member is in the form of a spout and the outer member is in the form of a sleeve slidable on the spout to open and close the outlet, and wherein the spout and sleeve are provided with co-operating axial formations that are engageable to prevent relative rotation between the spout and sleeve.

* * * * *

UNITED STATES PATENT AND TRADEMARK OFFICE

CERTIFICATE OF CORRECTION

PATENT NO. : 6,938,836 B2
DATED : September 6, 2005
INVENTOR(S) : Bouic

It is certified that error appears in the above-identified patent and that said Letters Patent is hereby corrected as shown below:

Column 2,
Line 37, delete “presents” and insert -- present --, therefor.

Column 11,
Line 64, after “reservoir” delete “,” and insert -- . --, therefor.

Column 15,
Line 58, delete “plasma” and insert -- closing --, therefor.

Column 16,
Line 7, delete “provide” and insert -- provided --, therefor.

Signed and Sealed this

Twenty-second Day of November, 2005

JON W. DUDAS
*Director of the United States Patent and Trademark Office*